United States Patent
Bart et al.

(10) Patent No.: US 7,412,819 B2
(45) Date of Patent: Aug. 19, 2008

(54) TURBOJET ARCHITECTURE WITH TWO FANS AT THE FRONT

(75) Inventors: Jacques Bart, Verrieres-le-Buisson (FR); Bruno Beutin, Evry (FR); Yann Lebret, Maincy (FR)

(73) Assignee: SNECMA, Paris (FR)

( * ) Notice: Subject to any disclaimer, the term of this patent is extended or adjusted under 35 U.S.C. 154(b) by 590 days.

(21) Appl. No.: 11/041,998

(22) Filed: Jan. 26, 2005

(65) Prior Publication Data

US 2005/0198941 A1 Sep. 15, 2005

(30) Foreign Application Priority Data

Feb. 11, 2004 (FR) .................................... 04 01336

(51) Int. Cl.
*F02K 3/065* (2006.01)
*F02K 3/072* (2006.01)

(52) U.S. Cl. .......................... 60/226.1; 60/268; 415/68; 415/144; 415/213.1

(58) Field of Classification Search ................ 415/220, 415/213.1, 144, 66, 68, 69, 142; 361/695; 454/184; 60/226.1, 268, 39.162
See application file for complete search history.

(56) References Cited

U.S. PATENT DOCUMENTS

| 3,486,328 A | 12/1969 | Boudigues |
| 3,713,748 A | 1/1973 | Langley |
| 3,861,139 A | 1/1975 | Jones |
| 4,860,537 A | 8/1989 | Taylor |
| 2003/0163983 A1* | 9/2003 | Seda et al. .................. 60/226.1 |

FOREIGN PATENT DOCUMENTS

| EP | 0 623 736 A1 | 11/1994 |
| EP | 1 340 903 A2 | 9/2003 |
| GB | 2 189 844 A | 11/1987 |

* cited by examiner

*Primary Examiner*—Edward Look
*Assistant Examiner*—Asefeh Hemmati
(74) *Attorney, Agent, or Firm*—Oblon, Spivak, McClelland, Maier & Neustadt, P.C.

(57) ABSTRACT

A turbojet has a low-pressure compressor and two fans at the front of an intermediate casing which fans are driven by two independent shafts. The compressor is disposed under the rear fan and has a downstream ring of rotor blades connecting the rear fan to the drive shaft of the rear fan, an upstream rotor blade ring that is connected to the drive shaft of the front fan and at least one ring of stator blades that is disposed between the rings of rotor blades and inside an outer stator that is supported by a second intermediate casing. Bearings are interposed respectively between the two intermediate casings and the two shafts.

10 Claims, 2 Drawing Sheets

TURBOJET ARCHITECTURE WITH TWO FANS AT THE FRONT

The invention relates to a three-spool by-pass turbojet with a high by-pass ratio, the turbojet having a front fan and a rear fan at the front of an intermediate casing that presents an outer structural grid in the by-pass air flow and an inner structural grid in the main air flow, the fans having blades that extend radially outwards to a fan casing, which fan casing outwardly defines the by-pass air flow, the turbojet also having a low-pressure compressor for compressing air coming into the channel for the main air flow, said front fan and said rear fan being rotated directly, and separately, by two shafts that are coaxial.

BACKGROUND OF THE INVENTION

In a modern, high-power turbojet with a high by-pass ratio, the fan has a large diameter, and the peripheral speed at the tips of the blades is proportional both to this diameter and to the speed of rotation of the fan. In order to obtain good efficiency, the peripheral speed must be lower than the speed of sound. In a conventional turbojet having a single fan, this is made possible by interposing reduction gearing between the drive shaft and the fan. Nevertheless, gearing increases the weight of the engine considerably and also reduces efficiency. Another technique consists in equipping the turbojet with two fans, a front fan and a rear fan, said fans being assembled at the front of the intermediate casing, and each fan being driven by a respective low speed drive shaft, without any interposed reduction gearing. Each fan supplies the air flowing in the by-pass air channel with substantially half the propulsion power of the by-pass air.

In turbojets that have two fans at the front of the intermediate casing, said fans being supported by said intermediate casing, the front fan is at a considerable overhang, particularly since there needs to be sufficient distance between the blades of the two fans in order to avoid excessive noise.

The state of the art is illustrated, in particular, by U.S. Pat. Nos. 3,861,139 and 4,860,537, which describe turbojets of the type mentioned in the introduction each having two counter-rotatable fans, which fans are connected to a low-pressure compressor also having counter-rotatable rotors, the inner rotor being driven by the drive shaft for the front fan and the outer rotor being driven by the drive shaft for the rear fan.

OBJECTS AND SUMMARY OF THE INVENTION

The object of the invention is to provide a turbojet having two fans, in which the drawbacks related to the overhang are eliminated.

The invention achieves this object by the fact that the blades of the rear fan extend into the by-pass air flow from a wheel that is connected to its drive shaft via a downstream ring of rotor blades in the low-pressure compressor, said low-pressure compressor also comprising at least one upstream ring of rotor blades that is driven by the drive shaft for the front fan, and an outer stator in the bore from which grids of stator blades extend, said grids being interleaved between the rings of rotor blades, said outer stator being carried by the fan casing via a second intermediate casing having a second outer structural grid in the by-pass air flow between the blades of the front fan and the blades of the rear fan, and a second inner structural grid in the main air flow, and by the fact that the first intermediate casing supports the rotary shaft of the rear fan via an axial thrust bearing, and the drive shaft of the front fan via an inter-shaft bearing, and additional bearings are also interposed between said second intermediate casing and said shafts.

In a first embodiment of the invention, the thrust bearing of the drive shaft of the front fan is supported by the second intermediate casing, and the inter-shaft bearing is a roller bearing.

In a second embodiment of the invention, the inter-shaft bearing is a thrust bearing, and the bearing that is interposed between the second intermediate casing and the drive shaft of the front fan is a roller bearing.

The bearing that is interposed between the second intermediate casing and the drive shaft of the rear fan is a roller bearing.

The first intermediate casing also supports the drive shaft of the high-pressure compressor via a thrust bearing.

Very advantageously, the front fan and the rear fan are counter-rotatable fans.

BRIEF DESCRIPTION OF THE DRAWINGS

Other advantages and characteristics of the invention appear on reading the following description given by way of example and with reference to the accompanying drawings, in which.

MORE DETAILED DESCRIPTION

Figure 1:
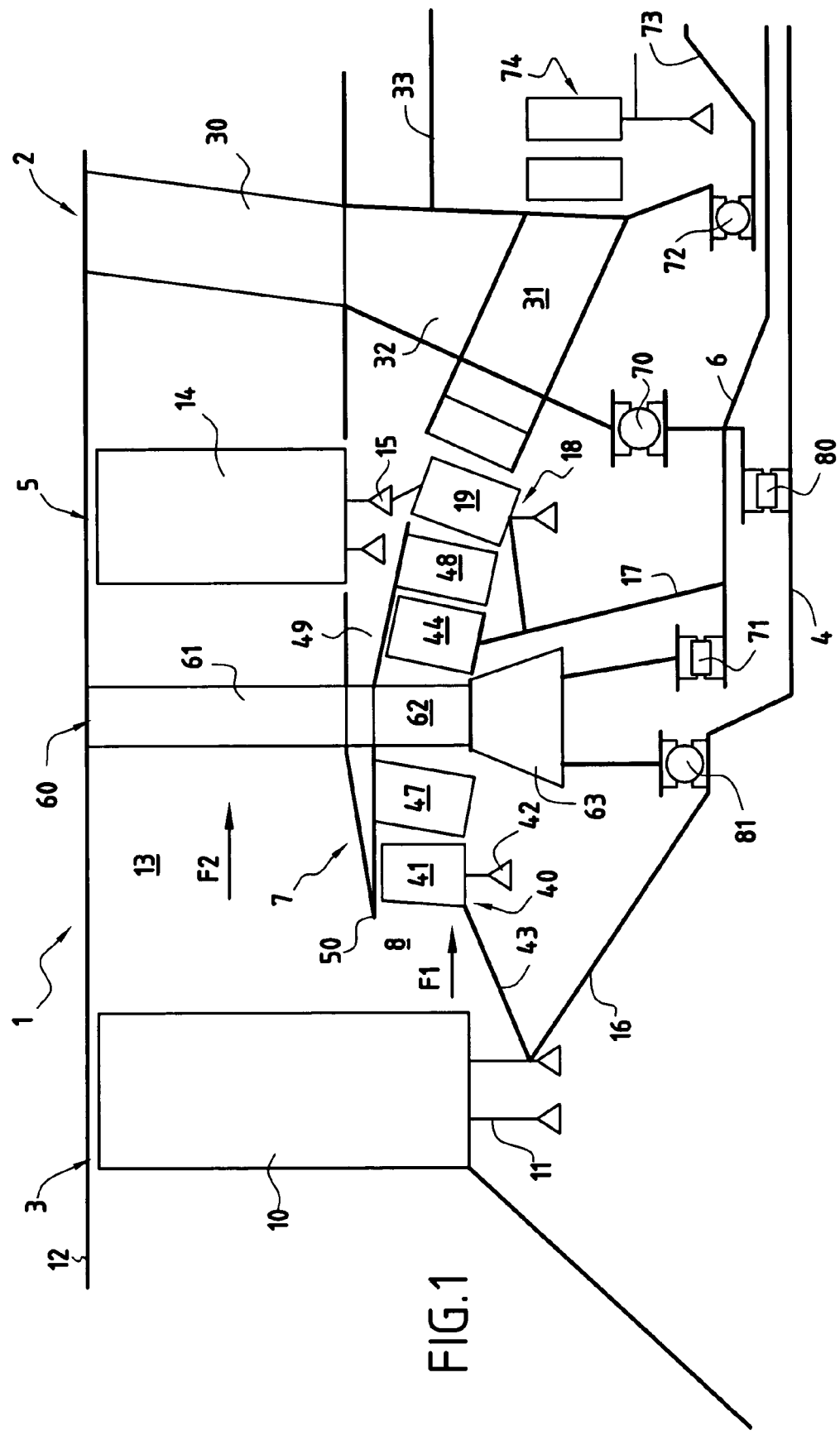
FIG. 1 is a fragmentary half-section of the front of a turbojet constituting a first embodiment of the invention.
Figure 2:
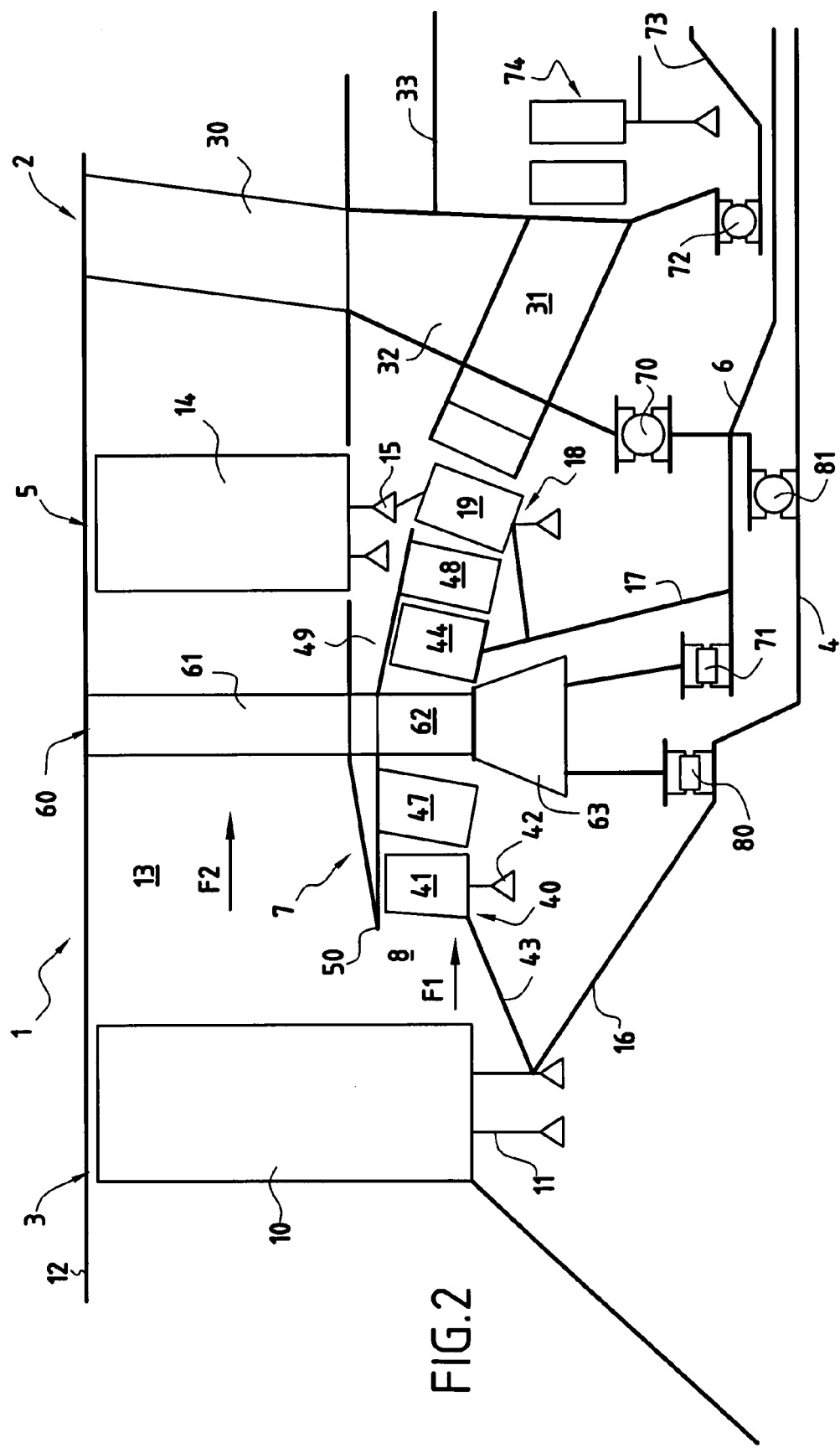
FIG. 2 is a fragmentary half-section of the front of a turbojet constituting a second embodiment of the invention.

FIGS. 1 and 2 are fragmentary sections of the front 1 of a turbojet of axis X, that, at the front of an intermediate casing 2, includes: a front fan 3 driven by an inner drive shaft 4; a rear fan 5 driven by an intermediate drive shaft 6, said intermediate drive shaft being coaxial with the inner shaft 4 and surrounding said inner shaft; and a low-pressure compressor 7 for compressing the air that penetrates into the channel 8 for the primary or "main" air flow (F1), which low-pressure compressor is disposed axially between the front fan 3 and the rear fan 5.

The front fan 3 has blades 10 which extend from the periphery of a wheel 11 out to a fan casing 12 defining the outside of the channel 13 for the secondary or "by-pass" air flow F2.

The rear fan 5 also has blades 14 that extend from the periphery of a wheel 15 out to the fan casing 12, through the channel 13 for the by-pass air F2. The wheel 15 is disposed radially outside the low-pressure compressor 7.

The wheel 11 of the front fan 3 is connected to the inner shaft 4 by a cone 16, whereas the wheel 15 of the rear fan 5 is connected to the intermediate shaft 6 by a cone 17 and via a downstream ring 18 of rotor blades 19 in the low-pressure compressor 7.

The intermediate casing 2 has an outer structural grid 30 in the stream of by-pass air F2 and an inner structural grid 31 in the stream of main air (F1). The outer structural grid 30 is connected outwardly to the fan casing 12. An annular box 32 is interposed between the outer structural grid 30 and the inner structural grid 31. Reference 33 designates thrust take-up bars that connect the intermediate casing 2 to the turbojet support strut, not shown in the drawings.

In addition to the downstream ring 18 of rotor blades 19, the low-pressure compressor 7 includes an upstream ring 40 of rotor blades 41 that extend from the periphery of a wheel 42 that is connected by a bushing 43 to the cone 16 or to the wheel 11, and an intermediate ring 44 of rotor blades that is driven by the intermediate drive shaft 6. Grids 47 and 48 of stator blades are interleaved between the rings of rotor blades of the compressor, said grids extending radially inside the bore of an outer stator 49 which has a separating tip 50 at its front end for separating the main air flow F1 from the by-pass air flow F2.

The outer stator 49 of the low-pressure compressor 7 is supported by the fan casing 12 via a second auxiliary casing 60 that has a second outer structural grid 61 in the by-pass air flow F2 between the blades 10 of the front fan 3 and the blades 14 of the rear fan 5, and a second inner structural grid 62 that is disposed in the main air flow F1, said second inner structural grid surrounding an annular box 63. Axially, the second inner structural grid 62 is disposed between the upstream grid 47 of stator blades and the intermediate ring 44 of rotor blades.

The downstream intermediate casing 2 and the second intermediate casing 60 support the axial and radial forces of the two shafts 4 and 6. The intermediate shaft 6 is supported by the downstream intermediate casing 2 by means of a thrust bearing 70 and by the second intermediate casing 60 by means of a roller-bearing 71. Reference 72 designates a thrust bearing enabling the intermediate casing 2 to support the drive shaft 73 of the high-pressure compressor 74 that is situated behind the downstream intermediate casing 2. An inter-shaft bearing 80 is interposed between the inner shaft 4 and the intermediate shaft 6, substantially in register with the thrust bearing 70 of the intermediate shaft 6, and a thrust bearing 81 is interposed between the inner shaft 4 and the box 63 of the second intermediate casing 60 downstream from the roller bearing 71.

In a first embodiment, shown in FIG. 1, the inter-shaft bearing 80 is a roller bearing and the bearing 81 is a thrust bearing. In this version, the axial forces of the front fan 3 that are supported by the second intermediate casing 60 cross the fan casing 12 before being taken up by the thrust take-up bars 33 in the intermediate casing 2. From a mechanical point of view, this technique is simple, but in terms of transferring forces, it is complicated.

In a second embodiment, shown in FIG. 2, the inter-shaft bearing 80 is a thrust bearing and the bearing 81 is a roller bearing. In this version the intermediate shaft 6 supports the axial forces of the front fan 3 and transfers these forces directly to the downstream intermediate casing 2 where they are taken up by the thrust take-up bars 33 in the intermediate casing 2. In terms of transferring forces, this technique is simple, but in terms of the connection between the thrust bearing 80 of the front fan 3 and the drive shaft 6 of the rear fan 5, it is complicated.

Both fans 3 and 5 can turn in the same direction. Very advantageously, however, the two fans 3 and 5 are counter-rotatable and driven by a working turbine having an inner rotor and an outer rotor, said two rotors having rings of rotor blades in axial alternation. This disposition reduces both the length and the weight of the working turbine because of the absence of a stator.

What is claimed is:

1. A three-spool by-pass turbojet with a high by-pass ratio, the turbojet having a front fan and a rear fan at the front of a first intermediate casing that presents a first outer structural grid in a by-pass air flow and a first inner structural grid in a main air flow, the fans having blades that extend radially outwards to a fan casing, which fan casing outwardly defines the by-pass air flow, the turbojet also having a low-pressure compressor for compressing air coming into a channel for the main air flow, said front fan and said rear fan being rotated directly, and separately, by two shafts that are coaxial, wherein the blades of the rear fan extend into the by-pass air flow from a wheel that is connected to its drive shaft via a downstream ring of rotor blades in the low-pressure compressor, said low-pressure compressor also comprising at least one upstream ring of rotor blades that is driven by the drive shaft for the front fan, and an outer stator in the bore from which grids of stator blades extend, said grids being interleaved between the rings of rotor blades, said outer stator being carried by the fan casing via a second intermediate casing having a second outer structural grid in the by-pass air flow between the blades of the front fan and the blades of the rear fan, and a second inner structural grid in the main air flow, and wherein the first intermediate casing supports the rotary shaft of the rear fan via an axial thrust bearing, and the drive shaft of the front fan via an inter-shaft bearing, and additional bearings are also interposed between said second intermediate casing and said shafts.

2. A turbojet according to claim 1, wherein the thrust bearing of the drive shaft of the front fan that is supported by the second intermediate casing and the inter-shaft bearing is a roller bearing.

3. A turbojet according to claim 1, wherein the inter-shaft bearing is a thrust bearing, and the bearing that is interposed between the second intermediate casing and the drive shaft of the front fan is a roller bearing.

4. A turbojet according to claim 2, wherein the bearing that is interposed between the second intermediate casing and the drive shaft of the front fan is a roller bearing.

5. A turbojet according to claim 1, wherein the first intermediate casing also supports the drive shaft of a high-pressure compressor via a thrust bearing.

6. A turbojet according to claim 1, wherein the front fan and the rear fan are counter-rotatable fans.

7. A turbojet according to claim 1, wherein said second outer structural grid is connected outwardly to said fan casing.

8. A turbojet according to claim 1, wherein said second outer structural grid and said second inner structural grid are radially aligned with each other.

9. A turbojet according to claim 1, wherein said second outer structural grid extends radially from said outer stator to said fan casing.

10. A turbojet according to claim 1, wherein said blades of said rear fan extend in said by-pass air flow between said first and second outer structural grids.

* * * * *